(12) United States Patent
Chen et al.

(10) Patent No.: US 9,612,251 B2
(45) Date of Patent: Apr. 4, 2017

(54) G-FORCE MEASUREMENT SYSTEM WITH A HORIZONTALLY DEVIATED ACCELEROMETER

(71) Applicants: Meng Liang Chen, Taipei (TW); Yi Huei Jen, Irvine, CA (US)

(72) Inventors: Meng Liang Chen, Taipei (TW); Yi Huei Jen, Irvine, CA (US)

( * ) Notice: Subject to any disclaimer, the term of this patent is extended or adjusted under 35 U.S.C. 154(b) by 0 days.

(21) Appl. No.: 14/503,172

(22) Filed: Sep. 30, 2014

(65) Prior Publication Data
US 2016/0091521 A1 Mar. 31, 2016

(51) Int. Cl.
*G01P 1/02* (2006.01)
*F16M 13/02* (2006.01)

(52) U.S. Cl.
CPC .............. *G01P 1/023* (2013.01); *F16M 13/02* (2013.01)

(58) Field of Classification Search
CPC ............................................... G01P 1/02
See application file for complete search history.

(56) References Cited

U.S. PATENT DOCUMENTS

| | | | |
|---|---|---|---|
| 3,284,617 A * | 11/1966 | Lerman | G01C 21/16 33/322 |
| 4,399,692 A * | 8/1983 | Hulsing, II | E21B 47/022 33/313 |
| 4,936,601 A * | 6/1990 | Tada | B60R 22/40 242/384.6 |
| 5,239,870 A * | 8/1993 | Kaneko | G01P 15/123 338/46 |
| 5,490,421 A * | 2/1996 | Ueyanagi | G01P 15/12 338/2 |
| 5,528,935 A * | 6/1996 | Welch | G01L 1/2231 73/493 |
| 5,866,818 A * | 2/1999 | Sumi | G01P 1/023 73/493 |
| 6,112,594 A * | 9/2000 | Brinks | G01P 1/023 73/493 |
| 6,115,261 A * | 9/2000 | Platt | H05K 3/301 200/61.45 R |
| 6,634,113 B1 * | 10/2003 | Almaraz | G01C 9/12 33/366.11 |
| 7,290,448 B2 * | 11/2007 | Shirasaka | B81B 7/007 73/493 |
| 7,428,841 B2 * | 9/2008 | Harada | G01C 9/06 73/488 |
| 7,489,299 B2 * | 2/2009 | Liberty | G06F 3/017 345/158 |
| 7,497,117 B2 * | 3/2009 | Ohta | G01C 19/56 73/493 |
| 7,568,390 B2 * | 8/2009 | Shizuno | G01P 1/023 73/493 |
| 7,586,280 B2 * | 9/2009 | Warren | E05F 15/611 318/266 |

(Continued)

*Primary Examiner* — Harshad R Patel
*Assistant Examiner* — Samir M Shah
(74) *Attorney, Agent, or Firm* — Che-Yang Chen; Law Offices of Scott Warmuth

(57) ABSTRACT

An acceleration measuring device to offset the limiting factors associated with the maximum acceleration an accelerometer can measure by attaching the device onto a mount system pre-calibrated to a specified angle relative to the horizontal axis of the object on which the system is mounted on.

1 Claim, 3 Drawing Sheets

(56) References Cited

U.S. PATENT DOCUMENTS

| | | | |
|---|---|---|---|
| 7,592,762 B2* | 9/2009 | Warren | E05F 15/611 318/266 |
| 7,595,548 B2* | 9/2009 | Shirasaka | B81B 7/0077 257/666 |
| 7,791,180 B2* | 9/2010 | Shirasaka | H01L 21/4842 257/674 |
| 7,886,596 B2* | 2/2011 | Matsunaga | G01C 19/56 73/504.02 |
| 8,256,288 B2* | 9/2012 | Matsunaga | G01C 19/5783 73/493 |
| 8,359,920 B2* | 1/2013 | Meyer | G01V 7/16 73/382 G |
| 8,816,480 B2* | 8/2014 | Kang | H01L 29/84 257/666 |
| 2007/0113207 A1* | 5/2007 | Gritton | G06F 3/017 715/863 |
| 2013/0035613 A1* | 2/2013 | Curtiss | A61B 5/6898 600/595 |
| 2015/0233718 A1* | 8/2015 | Grokop | G01C 21/165 701/501 |

* cited by examiner

G-FORCE MEASUREMENT SYSTEM WITH A HORIZONTALLY DEVIATED ACCELEROMETER

BACKGROUND

Presently, analysis and study of G-forces is significant in the fields of engineering, rocket science, astrophysics and planetary sciences. In this application, G-forces, as it is used, pertains to the force of acceleration as opposed to the force of gravity on a body. The calculation of force created by an object requires the use of a specialized device or an accelerometer for acceleration measurements. The issue with specialized devices is the cost associated with purchasing and at time operating the device. Therefore, most users will use an accelerometer to determine the acceleration and then use Newton's Second Law of Motion, Force is equal to mass time acceleration, to calculate the force produced. This then leads to the issue with accelerometers and high acceleration values. Accelerometers, while considerably less costly than specialized force calculation devices, are also rather costly based on the maximum recordable range that the accelerometer can read. To measure these high accelerations, a sensor with a large dynamic range as well as a considerable sample rate is needed. Therefore, there is a need for a device that can allow a lower dynamic rage accelerometer to measure higher dynamic ranges of acceleration without the need to modify internal components of the accelerometer and still remain cost effective.

FIELD OF INVENTION

The present invention relates to an accelerometer mounted on a device or piece of equipment such as a cannon, rifle, handgun, air rifle, rocket, and car. Furthermore, this device will effectively allow a low dynamic range accelerometer to increase its maximum measureable dynamic range. Specifically, this device will allow the accelerometer to be mounted and internally mounted at an angle relative to the horizontal axis of acceleration and through physics determine a higher measurable range from a low range accelerometer.

SUMMARY OF INVENTION

The invention consists of an accelerometer attached to a mount. This mount will be pre-calibrated to allow the acceleration measuring element to sit at a specific angle relative to the horizontal axis of the mount. This angle will allow the accelerometer to measure an acceleration higher than the maximum rated acceleration range of the accelerometer. Furthermore, given the mass of an object and the acceleration provided by the present invention, a user can effectively calculate the force created by the object through Newton's Second Law of Motion.

DESCRIPTION OF DRAWINGS

The term "measurable device" is used to reference any device, equipment, or object that produces an acceleration upon motion.

The present invention, Angled Acceleration Measurement System, may best be understood by reference to the following description taken in connection with the accompanying drawings which reference numbers designate the parts throughout the figures and wherein.

DETAILED DESCRIPTION OF DRAWINGS

The following descriptions are set forth and have been assigned numerical designations to enable the reader to understand the reasoning behind and the application of the present invention. Even though specific configurations are shown, it should be noted that these are merely for illustrative purposes and the following figures show only one method of implementation and will be apparent to those skilled in the art that there are other similar methods and applications of the invention.

The following figures use a firearm hand guard as the measurable device.

Figure 1:
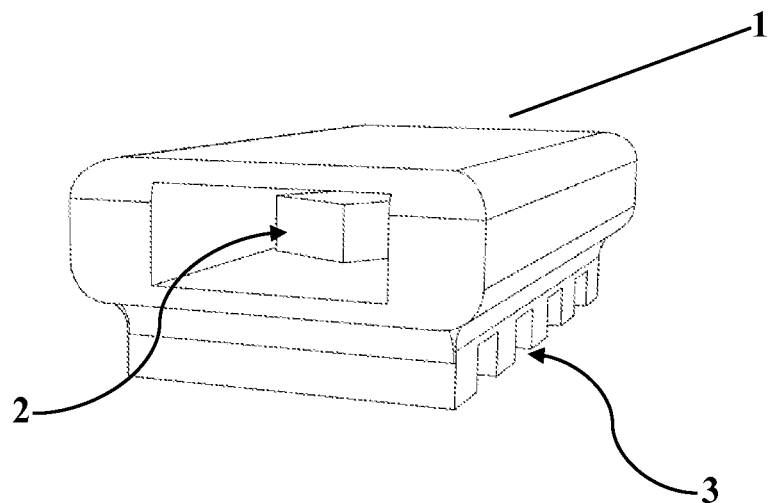
FIG. 1 is an isometric view of the present invention.

FIG. 1 illustrates the present invention (1), Angled Acceleration Measurement System, and its key components; accelerometer (2) and mounting apparatus system (3).

Figure 2:
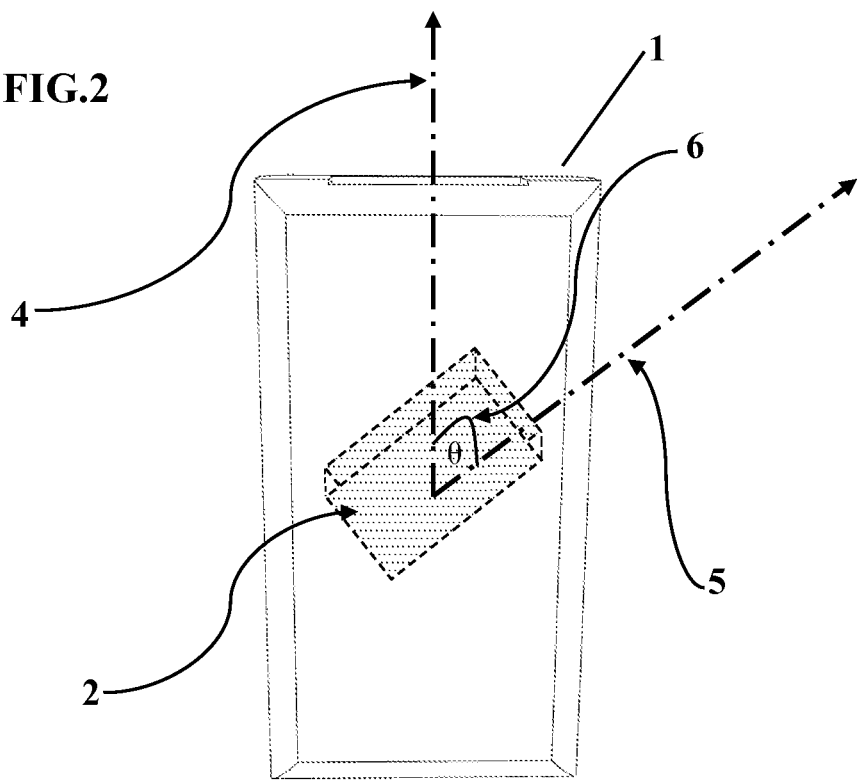
FIG. 2 is atop down view of the present invention.

FIG. 2 illustrates the present invention (1), with a transparent top surface, showing the accelerometer (2) situated at a predetermined direction (5) relative to the linear direction of motion (4) to create the angle theta (6).

Figure 3:
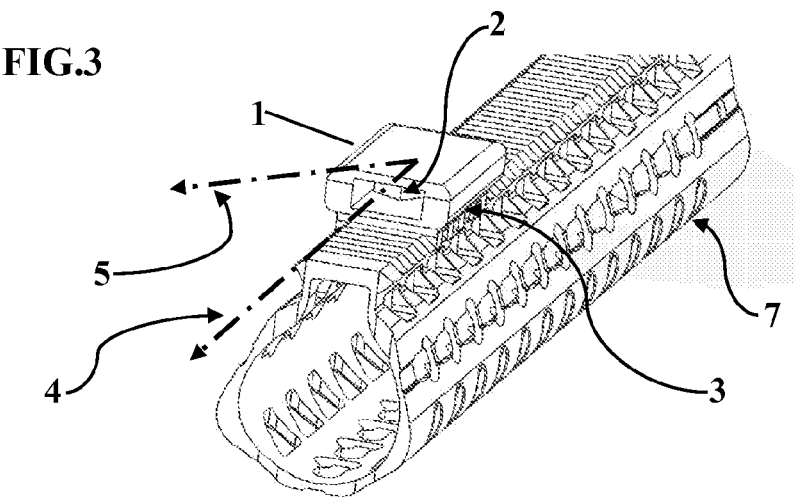
FIG. 3 is an isometric view of the present invention attached to a measurable device.

FIG. 3 is an illustration of the present invention (1) attached via mounting apparatus system (3) onto a measurable device (7). This illustration also shows the accelerometer (2) at a predetermined direction (5) relative to the direction of motion (4).

Figure 4:
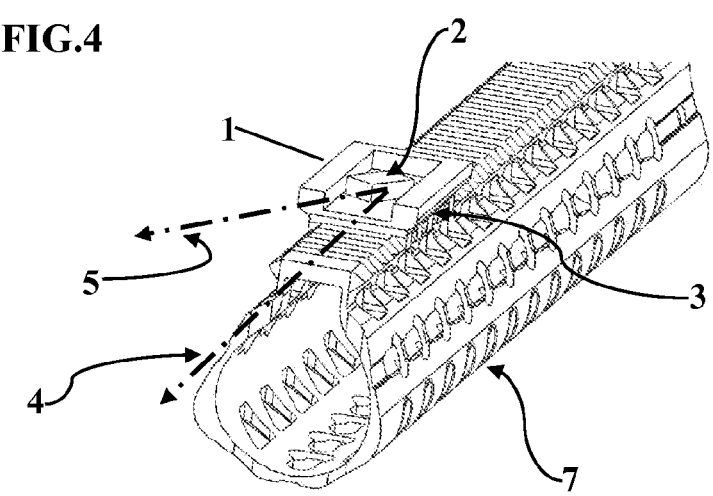
FIG. 4 is a partial isometric view of the present invention attached to a measurable device with its top half removed.
Figure 5:
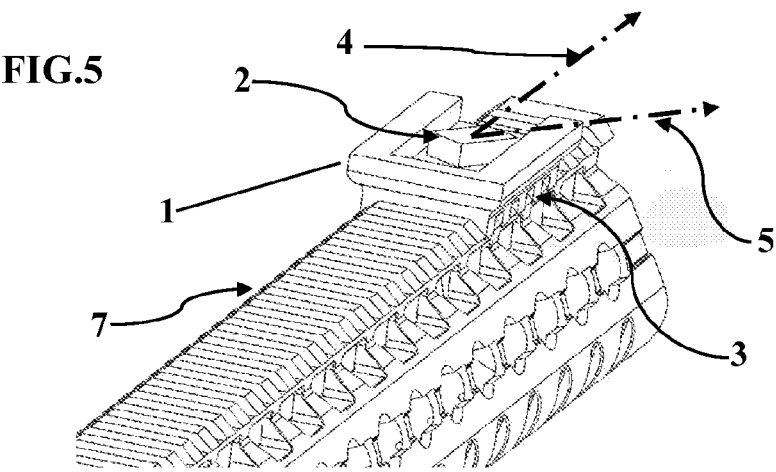
FIG. 5 is also an isometric view of the present invention with its top half removed and attached to a measurable device.

FIG. 4 and FIG. 5 illustrates a partial view of the present invention (1) from opposing viewpoints. FIG. 4 is in front of the direction of motion (4) while FIG. 5 is behind the direction of motion (4).

Both figures show measurable device (7), mounting apparatus system (3), and the relative direction of the accelerometer (5).

Figure 6:
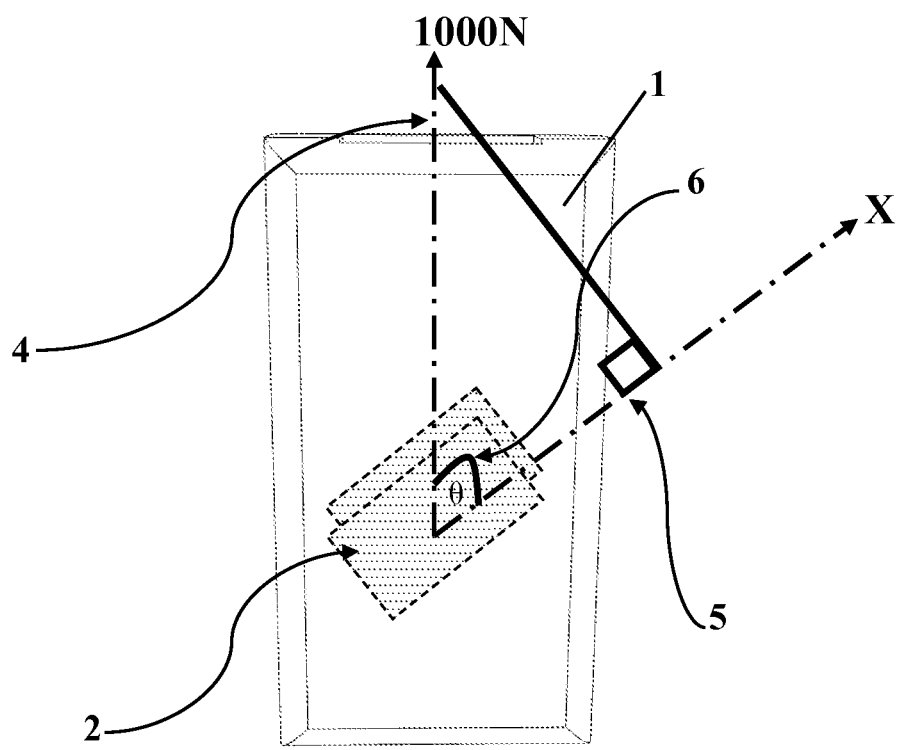
FIG. 6 is a representation of the present invention with examples to show calculations.

FIG. 6, similar to FIG. 1 is an illustration showing an example of how the present invention will function. In this figure, a maximum force of 1000N (4) is used with X as the maximum force the accelerometer (5) can record. Due to the resultant angle between the predetermined direction (5) relative to the linear direction of motion (4) the angle theta (6) is created. The calculations are as follows; 1000N is force that the measurable device (7) creates. From geometry and trigonometric functions, cos θ=adjacent force multiplied by 1/hypotenuse.

Therefore, cos θ=X multiplied by 1/1000 N. Resulting in X=1000N cos θ.

If we use a resultant theta θ (6) of 60°, the calculation will be X=1000N multiplied by 0.500.

Therefore, X will read 500N.

This means that a 500N maximum reading rated accelerometer (2) can read 1000N due to the angle created by the aforementioned predetermined direction (5) relative to the linear direction of motion (4).

The invention claimed is:

1. A G-force measurement apparatus to measure the force of acceleration created by a device due to an acceleration along a horizontal direction, the apparatus comprising:

an accelerometer; and a housing to receive the accelerometer,
wherein a mounting surface is formed at a bottom portion of the housing to horizontally mount the apparatus onto a horizontal surface of the device along the horizontal direction of the acceleration,
wherein the accelerometer is disposed in the housing, on a horizontal plane surface with respect to the mounting surface,
wherein the accelerometer is horizontally deviated from the horizontal direction of the acceleration by a predetermined angle (θ), so that the accelerometer measures a deviated acceleration along a direction that is horizontally deviated from the horizontal direction of the acceleration by the predetermined angle (θ), and
further wherein the G-force is obtained by dividing the measured deviated acceleration by cos (e) and multiplying the result by a mass of the device.

* * * * *